US012175676B2

(12) United States Patent
Orasanu et al.

(10) Patent No.: US 12,175,676 B2
(45) Date of Patent: Dec. 24, 2024

(54) APPARATUS FOR IDENTIFYING REGIONS IN A BRAIN IMAGE

(71) Applicant: KONINKLIJKE PHILIPS N.V., Eindhoven (NL)

(72) Inventors: Eliza Teodora Orasanu, Hamburg (DE); Fabian Wenzel, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 529 days.

(21) Appl. No.: 17/296,653

(22) PCT Filed: Nov. 14, 2019

(86) PCT No.: PCT/EP2019/081253
§ 371 (c)(1),
(2) Date: May 25, 2021

(87) PCT Pub. No.: WO2020/109006
PCT Pub. Date: Jun. 4, 2020

(65) Prior Publication Data
US 2022/0020152 A1   Jan. 20, 2022

(30) Foreign Application Priority Data

Nov. 26, 2018 (EP) .................................. 18208216

(51) Int. Cl.
*G06K 9/00* (2022.01)
*G06T 7/00* (2017.01)
(52) U.S. Cl.
CPC .. *G06T 7/0014* (2013.01); *G06T 2207/10081* (2013.01); *G06T 2207/30016* (2013.01)

(58) Field of Classification Search
CPC ..... G06T 2207/30016; G06T 7/10–194; G06T 2207/20021; G06T 2207/20112–20168;
(Continued)

(56) References Cited

U.S. PATENT DOCUMENTS

| 10,043,270 B2* | 8/2018 | Wächter-Stehle | ......... G06T 7/60 |
| 2006/0142983 A1* | 6/2006 | Sorensen | ............... G16H 70/60 |
| | | | 703/11 |

(Continued)

OTHER PUBLICATIONS

Aviv et al: "Alberta Stroke Program Early CT Scoring of CT Perfusion in Early Stroke Visualization and Assessment".
(Continued)

*Primary Examiner* — Atiba O Fitzpatrick
(74) *Attorney, Agent, or Firm* — Sherry Austin

(57) ABSTRACT

The invention relates to a regions identifying apparatus (1) for identifying regions in an image like a computed tomography image showing a brain. A model providing unit (6) provides a three-dimensional model of a head of a living being, wherein the three-dimensional model includes Alberta Stroke Program Early CT Score (ASPECTS) regions of a brain, and a regions identifying unit (7) identifies ASPECTS regions in the three-dimensional image by applying the three-dimensional model to the three-dimensional image. This allows for an accurate, automatic identification of the ASPECTS regions independently of the orientation of the head in an imaging system, independently of an image slice thickness and also independently of a respective user like a physician. This leads to imaging an improved accuracy of determining the ASPECTS regions which allows for an improved quantification of ischemic changes in the brain after stroke. This in turn also allows for an improved treatment recommendation.

18 Claims, 6 Drawing Sheets

(58) Field of Classification Search
CPC ......... G06T 7/0014; G06T 2207/10081; G06T 2207/10072; G06T 2207/30104; G06T 7/0012–0016; G06T 2207/30004–30104; G06T 7/11; G06T 2207/30096; A61B 6/501; A61B 2576/026; A61B 5/0042; A61B 5/7485; A61B 6/5217; A61B 6/504; A61B 6/032; A61B 6/507; A61B 6/03; A61B 5/02007; A61B 6/5211–5252; G06V 10/25–273; G06V 20/49; G06V 20/695; G06V 40/162; G06V 20/80; G06V 20/698; G06V 2201/03; G06V 10/751; G06K 9/6224; G16H 50/30; G16H 50/20; G16H 30/40; G16H 15/00
See application file for complete search history.

(56) References Cited

U.S. PATENT DOCUMENTS

| | | | | |
|---|---|---|---|---|
| 2008/0249755 | A1* | 10/2008 | Tek | G06T 7/0012 703/11 |
| 2010/0260394 | A1 | 10/2010 | Meetz et al. | |
| 2011/0229003 | A1* | 9/2011 | Yang | A61B 5/055 382/128 |
| 2012/0327075 | A1* | 12/2012 | Zagorchev | G06T 7/0012 345/419 |
| 2016/0157800 | A1* | 6/2016 | Goyal | A61B 6/486 600/431 |
| 2016/0166159 | A1* | 6/2016 | Yang | A61B 6/481 600/431 |
| 2017/0032520 | A1* | 2/2017 | Nitzken | G06T 7/0012 |
| 2017/0236294 | A1* | 8/2017 | Fisher | G06T 7/0012 600/419 |
| 2019/0108638 | A1* | 4/2019 | Zagorchev | G01R 33/5608 |
| 2019/0117179 | A1* | 4/2019 | Goyal | A61B 6/463 |
| 2019/0122363 | A1* | 4/2019 | Greveson | G06T 7/37 |
| 2019/0192089 | A1* | 6/2019 | Maresky | A61B 6/5217 |
| 2019/0197347 | A1* | 6/2019 | Okuda | G06T 17/00 |
| 2019/0267132 | A1* | 8/2019 | Fuchigami | G06T 11/60 |
| 2019/0274652 | A1* | 9/2019 | Goyal | A61B 6/504 |
| 2019/0290130 | A1* | 9/2019 | Zagorchev | G01R 33/4806 |
| 2020/0005461 | A1* | 1/2020 | Yip | A61B 5/725 |
| 2020/0176120 | A1* | 6/2020 | Wang | G16H 50/30 |
| 2021/0150714 | A1* | 5/2021 | Buerger | G16H 30/40 |
| 2023/0218169 | A1* | 7/2023 | Yang | A61B 5/0042 382/128 |

OTHER PUBLICATIONS

Barber et al: "Validity and Reliability of a Quantitative Computed Tomograpy Score in Predicting Outcome of Hyperacute Stroke Before Thrombolytic Therapy"; The Lancet, vol. 355, May 13, 2000, pp. 1670-1674.

Brosch et al: Deep-Learning-Based Boundary Detection for Model-Based Segmentation With Application to MR Prostate Segmentation; Miccai 2018:Medical Image Computing and Computer Assisted Intervention, pp. 515-522.

Ecabert et al: "Automatic Model-Based Segmentation of the Heart in CT Images"; IEEE Transactions on Medical Imaging, vol. 27, No. 9, Sep. 2008.

Herweh et al: Performance of e-ASPECTS Software in Comparison to That of Stroke Physicians on Assessing CT Scans of Acute Ischemic Stroke Patients; International Journal of Stroke, 2016, No. 11(4), pp. 438-445.

Hilbert, "Data-Efficient Convolutional Neural Networks for Treatment Decision Support in Acute Ischemic Stroke"; Master Thesis, University of Amsterdam, Jul. 20, 2018, 66 Page Document.

PCT/EP2019/081253, ISR & Written Opinion, Feb. 7, 2020, 14 Page Document.

Lee et al: "Deep Into the Brain: Artificial Intelligence in Stroke Imaging":Journal of Stroke, 2017, 19(3), pp. 277-285.

Peters et al: "Optimizing Boundary Detection via Simulated Search With Applications to Multi-Modal Heart Segmentation"; Medial Image Analysis, vol. 14 (2010), pp. 70-84.

Phan et al: "The Aspects Template is Weighted in Favor of the Striatocapsular Region"; Neuroimage, vol. 31 (2006), pp. 477-481.

Stoel et al: "Automated Brain Computed Tomographic Densitometry of Early Ischemic Changes in Acute Stroke"; Medical Imaging, vol. 2(1), Jan.-Mar. 2015, pp. 014004-01-014004-11.

Takahashi et al"Computer-Aided Detection Scheme for Identification of Hypoattenuation of Acute Stroke in Unenhanced CT"; Radiol Phys Technol (2012), vol. 5 pp. 98-104.

* cited by examiner

APPARATUS FOR IDENTIFYING REGIONS IN A BRAIN IMAGE

CROSS-REFERENCE TO PRIOR APPLICATIONS

This application is the U.S. National Phase application under 35 U.S.C. § 371 of International Application No. PCT/EP2019/081253, filed on Nov. 14, 2019, which claims the benefit of European Patent Application No. 18208216.4, filed on Nov. 26, 2018. These applications are hereby incorporated by reference herein.

FIELD OF THE INVENTION

The invention relates to a regions identifying apparatus, method and computer program for identifying regions in an image showing a brain.

BACKGROUND OF THE INVENTION

Detection and quantification of early ischemic changes in computed tomography images acquired after stroke are crucial for identifying the most appropriate therapy and treatment for a patient. The article "Alberta Stroke Program Early CT Scoring of CT Perfusion in Early Stroke Visualization and Assessment" by R. I. Aviv et al., American Journal of Neuroradiology, volume 28, pages 1975 to 1980 (2007) discloses a quantification of these early ischemic changes based on a so called Alberta Stroke Program Early Computed Tomography Score (ASPECTS). This score is assessed based on ischemic damages in 10 regions of interest, which can be named ASPECTS regions, in two two-dimensional slices of the respective computed tomography image. The identification of the ASPECTS regions in the two-dimensional slices is often not very accurate for several reasons like a non-optimal orientation of a patient's head in a computed tomography scanner, a non-optimal slice thickness or inter-user variabilities, i.e. different users often delineate the ASPECTS regions differently. This can lead to a reduced quality of the determined score and hence to a reduced quality of quantifying the ischemic changes in the brain.

Stoel Berend C et al. "Automated brain computed tomographic densitometry of early ischemic changes in acute stroke" discloses an automated ASPECTS method as a supplementary tool to assist manual scoring.

Noriyuki takahashi et al. "computer-aided detection scheme for identification of hypoattenuation of acute stroke in unenhanced CT" discloses a computer-aided detection scheme for identification of hypoattenuation of acute stroke on unenhanced CT images to select patients for thrombolysis of acute stroke.

SUMMARY OF THE INVENTION

It is an object of the present invention to provide a regions identifying apparatus, method and computer program for identifying regions in an image showing a brain, which allow for an improved quantification of ischemic changes in a patient's brain after stroke.

In a first aspect of the present invention a regions identifying apparatus for identifying regions in an image showing a brain is presented, wherein the regions identifying apparatus comprises:
an image providing unit configured to provide a three-dimensional image showing a brain of a living being,
a model providing unit configured to provide a three-dimensional model of a head of a living being, wherein the three-dimensional model includes ASPECTS regions of a brain,
a regions identifying unit configured to identify ASPECTS regions in the three-dimensional image by applying the three-dimensional model to the three-dimensional image.

Since a three-dimensional model is provided, which includes the ASPECTS regions of a brain, wherein this three-dimensional model is applied to a three-dimensional image showing a brain of a living being for identifying the ASPECTS regions in the three-dimensional image, the ASPECTS regions can be identified independently of the orientation of the head of the living being in an imaging system used for generating the three-dimensional image, independently of an image slice thickness and also independently of a respective user like a physician. This leads to an improved accuracy of determining the ASPECTS regions which allows for an improved quantification of ischemic changes in the brain after stroke. This also allows for an improved treatment recommendation.

The image providing unit can be an imaging scanner for generating a three-dimensional image showing a brain like a computed tomography scanner, a magnetic resonance imaging scanner, et cetera. However, the image providing unit can also be a storing unit and/or a receiving unit. For instance, the image providing unit can be adapted to receive the three-dimensional image from, for instance, an imaging scanner or a database like a database of a hospital, wherein the image providing unit can directly provide the received three-dimensional image to the regions identifying unit or can firstly store the received three-dimensional image which then can later be retrieved for providing the same.

The model providing unit is preferentially configured to provide the three-dimensional model such that it also includes at least one of the skull, the left hemisphere, the right hemisphere and ventricles. In particular, in an embodiment the provided three-dimensional model includes, besides the ASPECTS regions, all of the skull, the left hemisphere, the right hemisphere and ventricles. Since these elements are generally well-recognizable in the provided three-dimensional image, the application of the three-dimensional model to the three-dimensional image and hence the identification of the ASPECTS regions in the three-dimensional image can be further improved.

The model providing unit can be a storing unit and/or a receiving unit. The model providing unit can be adapted to receive the three-dimensional model from, for instance, a model generating unit being adapted to generate the three-dimensional model or a database like a database of a hospital, wherein the image providing unit can directly provide the received three-dimensional model to the regions identifying unit or can firstly store the received three-dimensional model which then can later be retrieved for providing the same. The model providing unit can also be the model generating unit itself.

If the three-dimensional model comprises the left hemisphere and the right hemisphere of the brain, the left hemisphere and the right hemisphere of the model are preferentially symmetric to each other. Thus, the three-dimensional model has preferentially a left-right symmetry with respect to the longitudinal fissure of the brain, which separates the left and right hemispheres. In particular, a same structure in the left hemisphere and the right hemisphere of the brain has a same topology. For instance, the model can be a surface model comprising surface meshes which are preferentially triangles, wherein the term "same topology" preferentially refers to a same number of surface meshes like triangles. Thus, in a preferred embodiment a same structure in the left hemisphere and the right hemisphere is modeled by a same number of surface meshes of the provided three-dimensional model. This allows for an easier comparison between structures in the left and right hemispheres which can lead to an improved detection of lesions in the brain.

Preferentially, the model providing unit is configured to provide the three-dimensional model such that it also defines slices of the brain, wherein the regions identifying unit can be further configured to determine two-dimensional slices of the brain in the three-dimensional image based on the three-dimensional model applied to the three-dimensional image and to identify the ASPECTS regions in the determined two-dimensional slices. This allows for an identification of ASPECTS regions in predefined two-dimensional slices, which are preferentially axial slices, very accurately, independently of the orientation of the head of the living being within an imaging scanner used for generating the three-dimensional image. In particular, the regions identifying unit can be configured to determine only two two-dimensional slices of the brain in the three-dimensional image based on the three-dimensional model applied to the three-dimensional image and to identify the ASPECTS regions in the determined two two-dimensional slices.

The regions identifying apparatus can further comprise a score determination unit configured to determine a score, which is indicative of ischemic changes in the brain, based on image values within the ASPECTS regions. In particular, the score determination unit can be configured to compare, for each ASPECTS region, the image values with image values of a control person or a control population for determining the score. In an embodiment the control person or the control population corresponds to a healthy brain, wherein the score determination unit is configured to a) compare the image values of a respective ASPECTS region of the living being with the image values of the respective ASPECTS region of the control person or the control population by applying a similarity measure to the image values, b) determine candidate ASPECTS regions having image values which are not similar to the image values of corresponding ASPECTS regions of the control person or the control population given the similarity measure, c) determine, among the candidate ASPECTS regions, candidate ASPECTS regions showing new ischemic stroke lesions, d) provide an initial score value, and e) determine the score by subtracting, for each candidate ASPECTS region, which has been determined as showing a new ischemic stroke lesion, a predefined value from the provided initial score. The score can be determined based on the three-dimensional ASPECTS regions identified in the three-dimensional image and/or based on two-dimensional ASPECTS regions identified in the two-dimensional slices. In particular, an accurate score can be determined already if only two-dimensional ASPECTS regions in two-dimensional slices are considered. It is even sufficient to use only two two-dimensional slices for determining the score, thereby requiring relatively low computational efforts.

The model providing unit is preferentially configured to provide the three-dimensional model of the brain such that it includes 10 ASPECTS regions, wherein the regions identifying unit is configured to identify the 10 ASPECTS regions in the three-dimensional image by applying the three-dimensional model to the three-dimensional image. The 10 ASPECTS regions are preferentially each formed by two corresponding sub-regions, one in the left hemisphere of the brain and one in the right hemisphere of the brain. In particular, a first ASPECT region is formed by the anterior middle cerebral artery (MCA) cortex (M1) in the two hemispheres, a second ASPECT region is formed by the MCA cortex lateral to the insular ribbon (M2) in the two hemispheres, a third ASPECT region is formed by the posterior MCA cortex (M3) in the two hemispheres, a fourth ASPECT region is formed by the anterior cortex immediately rostral to M1 (M4) in the two hemispheres, a fifth ASPECT region is formed by the lateral cortex immediately rostral to M3 (M5) in the two hemispheres, a sixth ASPECT region is formed by the posterior cortex immediately rostral to M3 (M6) in the two hemispheres, a seventh ASPECT region is formed by the lentiform nucleus (L) in the two hemispheres, an eighth ASPECT region is formed by the caudate (C) in the two hemispheres, a ninth ASPECT region is formed by the insular ribbon (I) in the two hemispheres and a tenth ASPECT region is formed by the internal capsule (IC) in the two hemispheres. Moreover, the image providing unit is preferentially configured to provide a computed tomography image as the three-dimensional image. If the three-dimensional model includes 10 ASPECTS regions, the application of the three-dimensional model to the three-dimensional image can be further improved. Moreover, this application and hence the accuracy of determining the ASPECTS regions in the three-dimensional image and thereby also the quantification of the ischemic changes can even be further improved, if the three-dimensional image is a three-dimensional computed tomography image.

In a further aspect of the present invention a regions identifying method for identifying regions in an image showing a brain is presented, wherein the regions identifying method comprises:

providing a three-dimensional image showing a brain of a living being by an image providing unit, providing a three-dimensional model of a head of a living being by a model providing unit, wherein the three-dimensional model includes ASPECTS regions of a brain, identifying ASPECTS regions in the three-dimensional image by applying the three-dimensional model to the three-dimensional image by a regions identifying unit.

In another aspect of the present invention a computer program for identifying regions in an image showing a brain is presented, wherein the computer program comprises program code means for causing a regions identifying apparatus as defined in claim 1 to carry out the steps of the regions identifying method as defined in claim 11, when the computer program is run on a computer controlling the regions identifying apparatus.

It shall be understood that the regions identifying apparatus of claim 1, the regions identifying method of claim 13 and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and eluci-dated with reference to the embodiments described hereinafter.

DETAILED DESCRIPTION OF EMBODIMENTS

Figure 1:
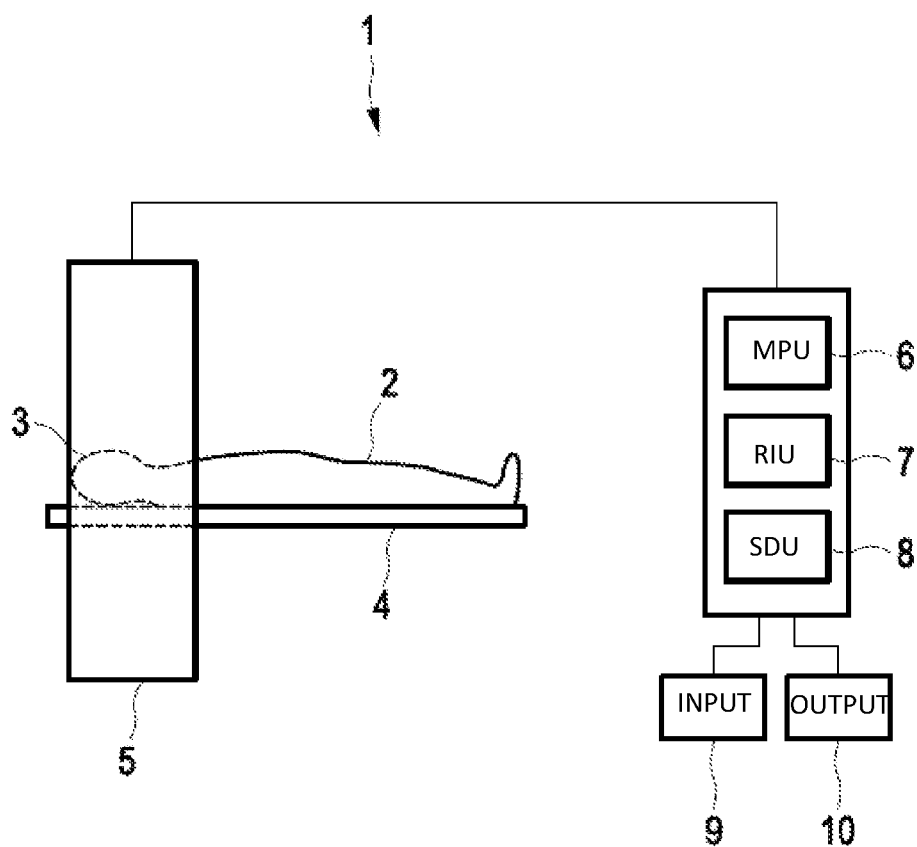
FIG. 1 schematically and exemplarily shows an embodiment of a regions identifying apparatus for identifying regions in an image showing a brain, FIG. 2 schematically and exemplarily illustrates several elements of a three-dimensional model of a head of a living being.

FIG. 1 shows schematically and exemplarily an embodiment of a regions identifying apparatus for identifying regions in an image of showing a brain. The regions identifying apparatus 1 comprises an image providing unit 5 configured to provide a three-dimensional image of a head 3 of a living being 2 lying on a support means like a patient table 4, wherein in this embodiment the image providing unit 5 is a computed tomography scanner for providing a three-dimensional computed tomography image. The three-dimensional computed tomography image is preferentially a non-contrast computed tomography image, i.e. a computed tomography image which has been generated, while no contrast agent was present in the head.

Figure 2:
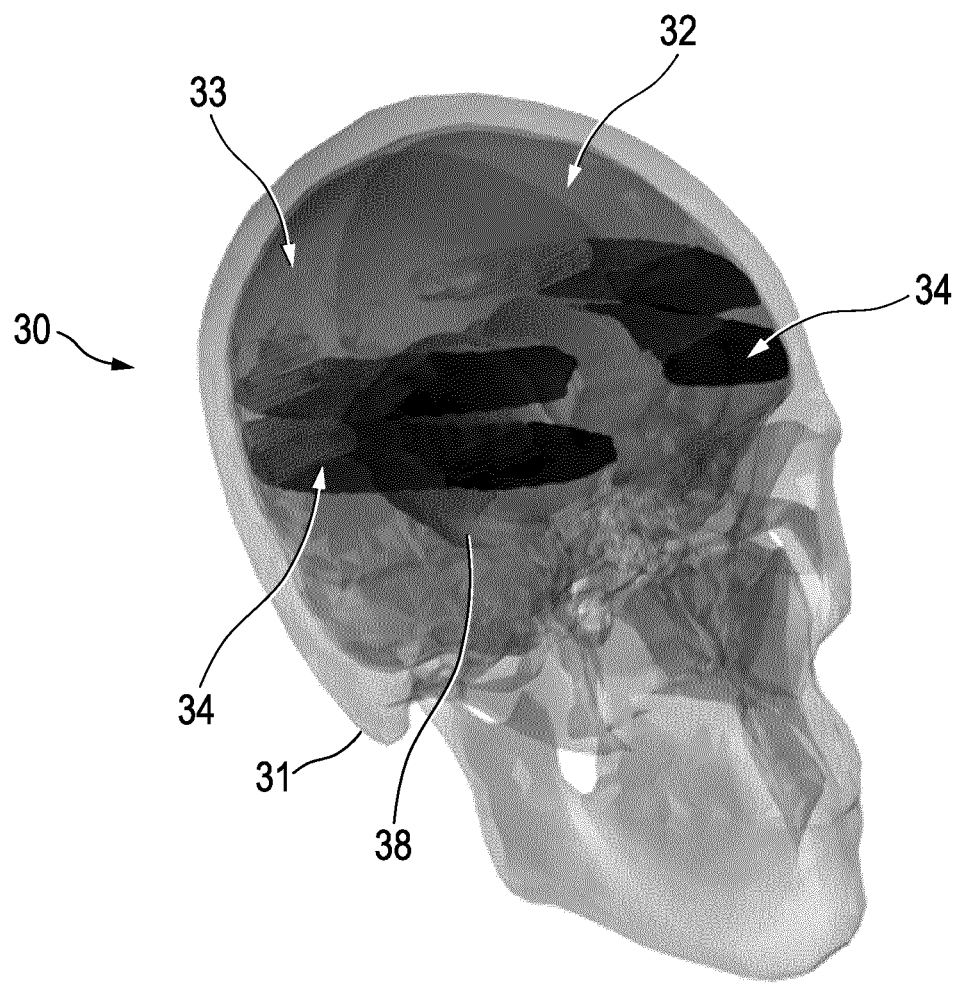
Figure 3:
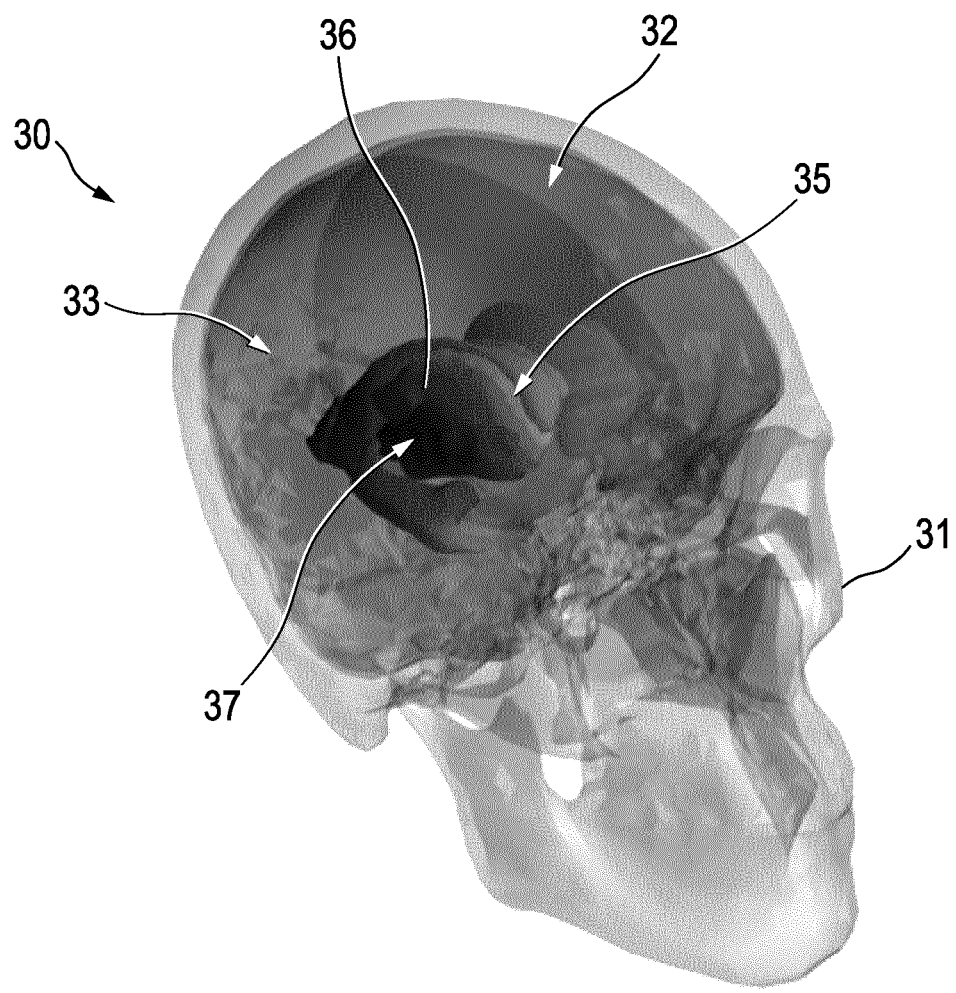
FIG. 3 illustrates further elements of the three-dimensional model shown in FIG. 2, FIG. 4 schematically and exemplarily shows two two-dimensional axial slices of a provided three-dimensional image, which have been determined by using the three-dimensional model illustrated in FIGS. 2 and 3.

The regions identifying apparatus 1 further comprises a model providing unit 6 configured to provide a three-dimensional model 30 of the head which is schematically and exemplarily illustrated in FIGS. 2 and 3. The three-dimensional model includes a skull 31, a left hemisphere 32, a right hemisphere 33 and ventricles 38. Moreover, the three-dimensional model 30 includes the ASPECTS regions M1-M6 referenced in FIG. 2 by reference number 34 and the subcortical ASPECTS regions internal capsule (IC) referenced by reference number 35, lentiform nucleus (L) referenced by reference number 36 and insular ribbon (I) referenced by reference number 37. The further ASPECTS region caudate (C) is also included in the three-dimensional model 30, but not visible in FIGS. 2 and 3. Thus, besides the skull 31, the left and right hemispheres 32, 33 and the ventricles 38, the three-dimensional model 30 includes 10 ASPECTS regions, wherein each ASPECTS region is formed by two corresponding sub-regions in the two hemispheres of the brain.

The left hemisphere 32 and the right hemisphere 33 of the model 30 are symmetric to each other. In particular, the same structure in the left hemisphere 32 and in the right hemisphere 33 of the brain has the same topology. In this embodiment the three-dimensional model is a surface mesh made of triangular surface elements, wherein a same structure in the left hemisphere 32 and in the right hemisphere 33 has the same number of triangular mesh elements. For example, the left caudate and the right caudate are modeled by a same number of triangular mesh elements.

The regions identifying apparatus 1 further comprises a regions identifying unit 7 configured to identify ASPECTS regions in the provided three-dimensional computed tomography image by applying the three-dimensional model 30 to the provided three-dimensional computed tomography image. Thus, the 10 ASPECTS regions in the provided three-dimensional computed tomography image are segmented by using the provided three-dimensional model 30.

Figure 4:
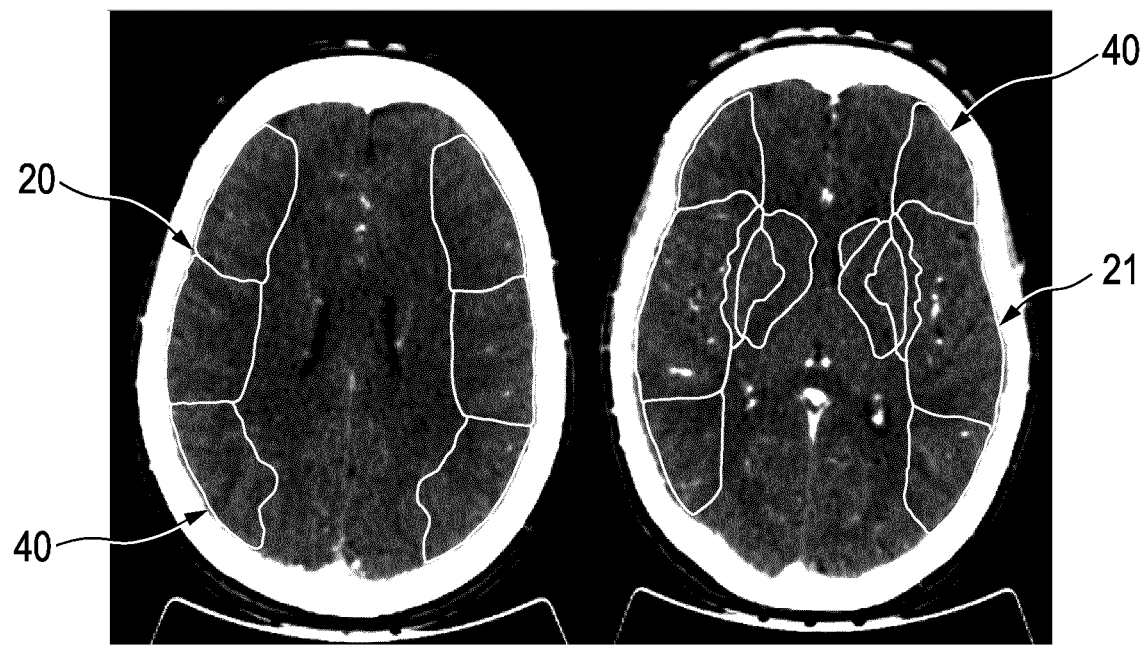

The three-dimensional model 30 is provided such that it also defines axial slices of the brain, wherein the regions identifying unit 7 is further configured to determine two-dimensional slices 20, 21 of the brain in the three-dimensional computed tomography image based on the three-dimensional model 30 applied to the three-dimensional computed tomography image and to identify the ASPECTS regions in the determined two-dimensional axial slices 20, 21 which are schematically and exemplarily illustrated in FIG. 4. In this example the slice 20 is an upper axial slice and the slice 21 is a lower axial slice within the head. The identified ASPECTS regions in the two-dimensional axial slices 20, 21 are indicated in FIG. 4 by lines 40.

The regions identifying apparatus 1 further comprises a score determination unit 8 configured to determine a score, which is indicative of ischemic changes in the brain, based on image values within the ASPECTS regions in the determined two-dimensional axial slices 20, 21. In particular, the score determination unit 8 is configured to determine ASPECTS as the score. The regions identifying apparatus 1 also comprises an input unit 9 like a keyboard, a computer mouse, a touchpad, et cetera and an output unit 10 like a display.

Figure 5:
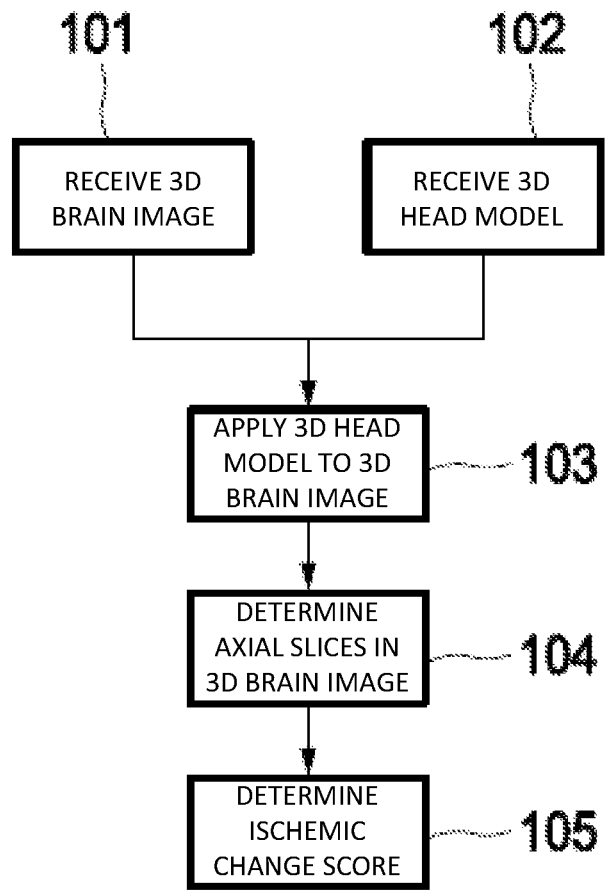
FIG. 5 shows a flowchart exemplarily illustrating an embodiment of a regions identifying method for identifying regions in an image of showing a brain, and FIG. 6 schematically and exemplarily shows a further embodiment of a regions identifying apparatus for identifying regions in an image showing a brain.

In the following an embodiment of a regions identifying method for identifying regions in an image showing a brain will exemplarily be described with reference to a flowchart shown in FIG. 5.

In step 101 a three-dimensional image showing a brain of a living being is provided by the image providing unit 5, wherein in this embodiment a three-dimensional computed tomography image is provided by the image providing unit 5. In step 102 the model providing unit 6 provides a three-dimensional model 30 of a head of a living being, wherein this three-dimensional model 30 includes 10 ASPECTS regions of a brain, wherein each ASPECTS region is formed by two corresponding sub-regions in the two hemispheres of the brain. In this embodiment the three-dimensional model 30 also includes, i.e. models, the skull, the left and right hemispheres and ventricles.

In step 103 the three-dimensional model 30 is applied to the three-dimensional computed tomography image by the regions identifying unit 7 for identifying ASPECTS regions in the three-dimensional computed tomography image. Thus, the 10 ASPECTS regions are segmented in the three-dimensional computed tomography image by using the provided three-dimensional model 30. In step 104 two two-dimensional axial slices of the brain are determined in the three-dimensional computed tomography image based on the provided three-dimensional model applied to the three-dimensional computed tomography image and the ASPECTS regions are identified in the determined two two-dimensional axial slices based on the corresponding segmentations in the three-dimensional computed tomography image. In step 105 the score determination unit 8 determines a score which is indicative of ischemic changes in the brain, especially an ASPECTS, based on image values within the ASPECTS regions identified in the determined two two-dimensional axial slices.

Although in the embodiment described above with reference to FIG. 1 the image providing unit is an imaging scanner, particularly a computed tomography scanner, in another embodiment the image providing unit can also just be a storing unit in which the three-dimensional image is stored and from which the stored three-dimensional image can be retrieved for providing the same. The image providing unit can also be a receiving unit for receiving the three-dimensional image from, for instance, an imaging scanner or an image database, wherein also in this example the image providing unit can be adapted to provide the three-dimensional image, i.e. in this case the received three-dimensional image.

Figure 6:
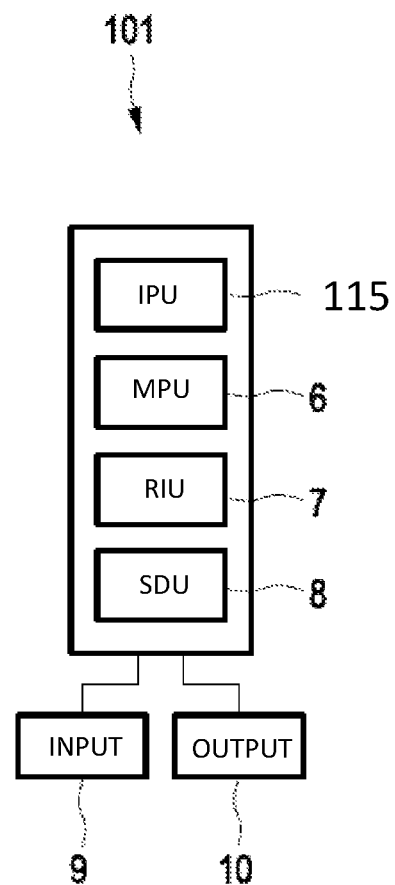

FIG. 6 shows schematically and exemplarily an embodiment with an image providing unit 115 being a storing unit for storing a three-dimensional image and for providing the stored three-dimensional image to the regions identifying unit 7. The corresponding regions identifying apparatus 101 further comprises the model providing unit 6, the regions identifying unit 7, the score determination unit 8, the input unit 9 and the output unit 10 as described above with reference to FIG. 1.

Detection and quantification of early ischemic changes in computed tomography acquired after stroke are crucial for identifying the most appropriate therapy and treatment for a patient. The variety of these changes can be quantified using ASPECTS as disclosed, for instance, in the above mentioned article by R. I. Aviv et al. This score is assessed on the ischemic damage in regions of interest, i.e. in the ASPECTS regions, and its accuracy depends on the quality of the delineation of the ASPECTS regions which is usually performed manually. The regions identifying apparatus and method for identifying regions in an image showing a brain described above with reference to FIGS. 1 to 6 use a three-dimensional model of a head of a person which shows the brain and which could therefore also be regarded as being a three-dimensional brain model. The three-dimensional model can be trained by using real data, i.e. real three-dimensional images of real patients, and corresponding ASPECTS regions which have been delineated very accurately for training purposes. The three-dimensional model is used to automatically delineate the ASPECTS regions in a consistent way. By using the three-dimensional model for identifying the ASPECTS regions, this identification of the ASPECTS regions can be independent of acquisition orientations and slice thicknesses of computed tomography images or observer intervariabilities. Moreover, this approach of determining the ASPECTS regions also has the advantage of being computationally very efficient.

In case of detecting and quantifying early ischemic changes after stroke, the three-dimensional image, particularly the three-dimensional computed tomography image, should be acquired before thrombolytic treatment of hyperacute ischemic strokes, because it is highly sensitive for the detection of intracerebral hemorrhage as disclosed, for instance, in the article "Validity and reliability of a quantitative computed tomography score in predicting outcome of hyperacute stroke before thrombolytic therapy" by P. A. Barber et al., The Lancet, volume 355, pages 1670 to 1674 (2000). Detection and quantification of early ischemic changes based on a three-dimensional image like a three-dimensional computed tomography image and its significance in correlation with functional outcome can be used to identify the most appropriate patients for interventional stroke therapy with thrombolytic drugs.

The ASPECTS, i.e. the score, is especially useful to quantify early ischemic changes on computed tomography brain scans from patients with middle cerebral artery stroke. ASPECTS is a 10-point quantitative topographic computed tomography scan score, wherein a segmental assessment of the MCA vascular territory is made and one point is deducted from the initial score of 10 for each of the ASPECTS regions that exhibits evidence of ischemic damage like a reduced attention, a loss of grey-white matter differentiation or a focal swelling. An image with no ischemia in the MCA territory would have the maximum score of 10, while a scan with diffuse involvement of the entire MCA territory would lead to a score of 0. An ASPECTS score being smaller than or equal to 7 predicts a worse functional outcome at 3 months as well as symptomatic hemorrhage. The ASPECTS regions, on which the ASPECTS, i.e. the respective score, is based, are the subcortical structures caudate (C), insular ribbon (I) and internal capsule (IC) and the MCA cortex regions lentiform nucleus (L), anterior MCA cortex (M1), MCA cortex lateral to the insular ribbon (M2), posterior MCA cortex (M3), anterior cortex immediately rostral to M1 (M4), lateral cortex immediately rostral to M3 (M5) and posterior cortex immediately rostral to M3 (M6). Without the regions identifying apparatus and method described above with reference to FIGS. 1 to 6, these 10 ASPECTS regions could be manually delineated on two axial computed tomography slices on which the scoring can be performed. However, instead of manually delineating the ASPECTS regions onto axial computed tomography slices, the regions identifying apparatus and method described above with reference to FIGS. 1 to 6 allow for an accurate automatic delineation of ASPECTS regions in a three-dimensional computed tomography image and hence on axial computed tomography slices, which are obtained from the three-dimensional computed tomography image, with relatively low computational efforts and independently of an orientation or tilting of the patient's head in the computed tomography scanner. The relatively low computational efforts lead to a fast identification of the ASPECTS regions which is important, because in stroke cases the time window is crucial and treatment planning has to be carried out in a relatively short time.

The regions identifying apparatus and method can accurately and fast identify the ASPECTS regions in the three-dimensional image and hence in two-dimensional slices of the three-dimensional image without requiring, for instance, a pre-processing for carrying out a tilt or orientation correction of the three-dimensional image because of the use of the three-dimensional model at least including the ASPECTS regions. In particular, the three-dimensional model is used to segment the ASPECTS regions in the provided three-dimensional image, in order to be independent of a patient's head orientation in a computed tomography scanner, i.e. the same ASPECTS regions can be segmented consistently, independently of a respective head orientation and slice thickness with relatively low computational efforts. The segmentation of the ASPECTS regions in the provided three-dimensional image can also be used to reformat the image orientation for a proper and consistent visualization of the ASPECTS regions as well as for automated quantification of the ASPECTS scoring. Thus, the apparatus can be adapted to show the three-dimensional image such that the head has a desired orientation which might be selectable by a user and/or which might be predefined. In particular, since the orientation of the head in the three-dimensional image is known due to the adaptation of the three-dimensional model to the three-dimensional image, the apparatus can adapt the three-dimensional image such that it shows the head in a desired and/or predefined orientation. The head can therefore be shown in a desired and/or predefined orientation independently of the actual orientation of the head during imaging and in the initially provided three-dimensional image. This means, for instance, that the heads of different patients can all be shown in a same orientation, independently of the actual orientation of the head during imaging and in the initially provided three-dimensional image.

Since the ASPECTS regions are segmented in the provided three-dimensional image by using the three-dimensional image model modelling the ASPECTS regions, the segmentation can be regarded as being a model-based segmentation. The model preferentially comprises a triangulated mesh representing the boundaries of the different elements to be modeled like the boundaries of the skull, of the left and right hemispheres, of the ventricles and of the different ASPECTS regions. The triangulated mesh representing the boundaries of the different elements to be modeled has been generated based on prior anatomical knowledge such that the segmentation of especially the ASPECTS regions is based on prior anatomical knowledge which makes the technique quite robust against possible artefacts in the provided three-dimensional image. This consideration of the prior anatomical knowledge can be regarded as being a regularization of the segmentation based on the prior anatomical knowledge. The segmentation is carried out such that the general shape of the different elements to be segmented is preserved. For the segmentation known segmentation algorithms can be used like the segmentations algorithms disclosed in the articles "Automatic Model-Based Segmentation of the Heart in CT Images" by O. Ecabert et al., IEEE Transactions on Medical Imaging, volume 27, pages 1189 to 1201 (2008), "Optimizing boundary detection via simulated search with applications to multi-modal heart segmentation" by J. Peters et al., Medical Image Analysis, volume 14, pages 70 to 84 (2010) and "Deep Learning-Based Boundary Detection for Model-Based Segmentation with Application to MR Prostate Segmentation" by T. Brosch et al., Medical Image Computing and Computer-Assisted Intervention—MICCAI 2018.

The provided three-dimensional model is preferentially a triangulated model comprising the ASPECTS regions, which is used to consistently and automatically segment the ASPECTS regions. As explained above, the use of the three dimensions has the advantage of being independent of the orientation of the patient's head in the image, wherein this approach has also the advantage of being computationally very efficient.

The three-dimensional model, which could also be regarded as being a three-dimensional brain model because of modelling the brain, is preferentially a left-right symmetric model which comprises the 10 ASPECTS regions, wherein each ASPECTS region is formed by two corresponding sub-regions in the two hemispheres of the brain, as well as additional structures such as the hemispheres and ventricles, which are visible in a computed tomography image and which will be used to aid the correct segmentation of the ASPECTS regions. The left-right symmetry of the preferred three-dimensional model refers to the longitudinal fissure of the brain, which separates the right and left hemispheres. The three-dimensional model can also model the skull as explained above. For generating the three-dimensional model, it can be trained on real data, i.e. on real three-dimensional computed tomography images of real patients with corresponding accurate manually generated delineations of the ASPECTS regions. The manual delineations used for training the model preferentially follow the ASPECTS delineation guidelines as disclosed in the above mentioned article by Aviv et al.

The model can be trained according to the training algorithm disclosed in the above mentioned articles by O. Ecabert et al. and by J. Peters et al. The training of the model can also be carried out by using a deep-learning approach as described, for instance, in the above mentioned article by T. Brosch et al.

The automatic delineation of the ASPECTS regions in the provided three-dimensional image can be used to automatically compute the ASPECTS, i.e. the score, by the score determination unit 8, wherein this determination of the score can be based on a comparison of the image values in the ASPECTS regions with corresponding image values of corresponding ASPECTS regions of a control population or by using machine learning approaches such as deep learning. In particular, since the three-dimensional model describes the ASPECTS regions of interest with consistent meshes across all subjects, in each provided three-dimensional image it is clear which image element corresponds to which ASPECTS region such that image values of same ASPECTS regions in different images can be compared by the score determination unit 8. In an embodiment, for each ASPECTS region the image values of a patient are compared with image values of a control person or a control population of healthy subjects. For this comparison preferentially a similarity measure is defined, wherein, if, given the similarity measure, the image values of a respective ASPECTS region of a patient are not similar to image values of a corresponding ASPECTS region of a healthy subject, this ASPECTS region is regarded as being a candidate ASPECTS region. In a classification step it is then determined which of the candidate ASPECTS regions is really affected by the current stroke, in order to distinguish such an ASPECTS region from an ASPECTS region comprising old ischemic lesions, tumors, Virchow spaces, et cetera. Based on the number of candidate ASPECTS regions, which have been classified as showing new ischemic lesions, the score can be determined. In particular, for each candidate ASPECTS region showing a new ischemic lesion one is subtracted from an initial value of ten. Thus, if all ASPECTS regions are candidate ASPECTS regions showing a new ischemic lesion, the score will be zero, and, if no ASPECTS region is a candidate ASPECTS regions showing a new ischemic lesion, the score will be ten. Here it should be noted that each ASPECTS region is formed by two corresponding sub-regions, wherein, if in one or both of the respective two sub-regions it is determined that they are adversely affected by the current stroke, one is deducted from the score which is initially ten. Thus, if one of the sub-regions forming the first ASPECTS region M1 is affected, one is deducted from the score, if one of the sub-regions forming the second ASPECT region M2 is affected, also one is deducted, and so on.

The similarity measure could be based on a deviation of histograms of intensity distributions of the images in the corresponding ASPECTS regions from each other. However, also other similarity measures can be used for comparing the image values in an ASPECTS region of a current patient with an ASPECT region of a control person or a control population. The similarity measure can output a similarity value which can be compared with a threshold for determining whether the image values of different regions are similar or not.

For classifying the candidate ASPECTS regions, classification techniques can be used which are based on artificial intelligence like neural networks trained for this classification step, histogram-based classification techniques, feature-based classification techniques, pattern-based classification techniques et cetera.

The determination which ASPECTS region is adversely affected by the current stroke and which ASPECTS region is not adversely affected by the current stroke can be carried out in the three-dimensional image or in two-dimensional axial slices of the image. These two-dimensional axial slices of the image can be automatically determined based on the three-dimensional model which has been adapted to the provided three-dimensional image. In particular, the two-dimensional axial slices can be defined with respect to the three-dimensional model such that, by adapting the three-dimensional model to the provided three-dimensional image, the two-dimensional axial slices are automatically determined. For instance, two two-dimensional slices can be automatically determined such that they are parallel to each other, wherein a first slice is at the level of the thalamus and basal ganglia and a second slice is adjacent the most superior margin of the ganglionic structures such that they are not seen.

Generally, a computed tomography image could be registered to an atlas template having an orientation which corresponds to the orientation of the brain in the computed tomography image in order to select two-dimensional axial slices in the computed tomography image. However, such a registration introduces registration errors which affects the selection of the two-dimensional axial slices and hence a possible subsequent delineation and determination of the score. In contrast to this, the regions identifying apparatus and method described above with reference to FIGS. 1 to 6 do not necessarily require such a registration step which might reduce errors. The selection of the two-dimensional slices in accordance with the described regions identifying apparatus and method shown in FIGS. 1 to 6 is also independent of the orientation of the brain in the three-dimensional image, because it involves the three-dimensional model including the ASPECTS regions and the adaptation of this three-dimensional model to the provided three-dimensional image. Moreover, such a registration of a provided three-dimensional image to an atlas template would still not include an automatic determination of the ASPECTS regions and an automatic calculation of the score. Furthermore, such a registration of a three-dimensional image to an atlas template requires relatively high computational efforts in comparison to just adapting the three-dimensional model including the ASPECTS regions to the provided three-dimensional image.

The ASPECTS regions are preferentially topologically symmetric by being defined by symmetric surface meshes which are preferentially triangular. Thus, the sub-region of an ASPECTS region in the left hemisphere like the left caudate has a same topology, i.e. preferentially a same number of triangles, as the sub-region of the same ASPECTS region in the right hemisphere like the right caudate. The sub-regions of a same ASPECTS region in the left hemisphere and the right hemisphere can therefore easily be compared, for instance, via mesh-based image warping, without requiring an extra pre-processing step. For instance, asymmetric lesions can be detected. That means it can be detected whether a lesion caused by the stroke in a left sub-region of an ASPECTS region is similar to a lesion in the corresponding right sub-region of the ASPECTS region or not under consideration of a predefined similarity measure. Also here the similarity measure could be based on a deviation of histograms of intensity distributions of the image values in the corresponding sub-regions of a same ASPECTS region from each other. However, also other similarity measures can be used for comparing the image values in a left sub-region of an ASPECTS region with a corresponding right sub-region of the same ASPECTS region.

Although in above described embodiments the provided three-dimensional model image is a computed tomography image, it could also be another kind of image which allows to identify whether the ASPECTS regions have been adversely affected by stroke or not. For instance, the provided three-dimensional image of the head including the brain could also be a magnetic resonance image.

Although in above described embodiments the ASPECTS, i.e. the score, is automatically determined by comparing the image values of a respective ASPECTS region with the image values of the respective ASPECTS region of a control person or a control population by applying a similarity measure to the image values, by determining candidate ASPECTS regions having image values which are not similar to the image values of corresponding ASPECTS regions of the control person or the control population given the similarity measure, by determining, among the candidate ASPECTS regions, candidate ASPECTS regions showing new ischemic stroke lesions, by providing an initial score value and by determining the score by subtracting, for each candidate ASPECTS region, which has been determined as showing a new ischemic stroke lesion, a predefined value from the provided initial score, the score can also be automatically determined in another way. For instance, it is also possible to compare the image values of a left sub-region of a respective ASPECTS region with a right sub-region of the same respective ASPECTS region by applying the similarity measure to the image values, wherein, if the image values of the left sub-region differ from the image values of the right sub-region of the respective ASPECTS region given the similarity measure, also this respective ASPECTS region can be determined as being a candidate ASPECTS region. Thus, for determining candidate ASPECTS regions the image values of the ASPECTS regions of the living being, i.e. of the current patient, can be compared with image values of corresponding ASPECTS regions of a control person or a control population and/or the image values of sub-regions of a same respective ASPECTS region of the living being, i.e. of the current patient, can be compared with each other.

For determining which ASPECTS regions are affected by the current stroke, it is also possible to use other means like artificial intelligence, for instance, a trained convolutional neural network. It is also possible to use pattern recognition techniques, which can be based on the shape of detected lesions, the mean of the image values of the detected lesions, et cetera. After it has been determined which ASPECTS regions are really affected by the new stroke, a score can be automatically determined by, for instance, subtracting for each ASPECTS region, which has been determined as having been affected by the new stroke, a predefined value from the provided initial score.

Although in above described embodiments the ASPECTS, i.e. the score, is automatically determined, it is of course also possible that the identified ASPECTS regions are just shown to a user like a physician who then can use these identified ASPECTS regions for determining a score.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like providing the three-dimensional model, applying the three-dimensional model to the provided three-dimensional image by adapting the three-dimensional model to the three-dimensional image, in order to identify the ASPECTS regions in the three-dimensional image, calculating a score based on image values in the identified ASPECTS regions, et cetera, performed by one or several units or devices, can be performed by any other number of units or devices. For example, steps 101 to 105 described above with reference to FIG. 5 can be performed by a single unit or by any other number of different units. These procedures and/or the control of the regions identifying apparatus in accordance with the regions identifying method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a regions identifying apparatus for identifying regions in an image like a computed tomography image showing a brain. A model providing unit provides a three-dimensional model of a head of a living being, wherein the three-dimensional model includes ASPECTS regions of a brain, and a regions identifying unit identifies ASPECTS regions in the three-dimensional image by applying the three-dimensional model to the three-dimensional image. This allows for an accurate, automatic identification of the ASPECTS regions independently of the orientation of the head in an imaging system, independently of an image slice thickness and also independently of a respective user like a physician. This leads to an improved accuracy of determining the ASPECTS regions which allows for an improved quantification of ischemic changes in the brain after stroke. This in turn also allows for an improved treatment recommendation.

The invention claimed is:

1. A system for identifying candidate Alberta Stroke Program Early Computer Tomography Score (ASPECTS) regions adversely affected by stroke in an image showing a brain, the system comprising:
    an image providing unit configured to access a three-dimensional image of a brain;
    a model providing unit configured to access a three-dimensional model of a head, wherein the three-dimensional model includes ASPECTS regions of a brain and defines axial slices, the three-dimensional model comprising a surface mesh composed of triangular surface elements, the axial slices consisting of two-dimensional axial slices;
    a regions identifying unit configured to identify ASPECTS regions in the three-dimensional image by applying the three-dimensional model to the three-dimensional image and delineating the ASPECTS regions onto the axial slices of the three-dimensional image; and
    a score determination unit configured to automatically compute an ASPECTS value by comparing image values in the delineated ASPECTS regions of the three-dimensional image with corresponding image values of corresponding ASPECTS regions of a control according to a similarity measure by:
    determining candidate ASPECTS regions, the candidate ASPECTS regions comprising image values in the delineated ASPECTS regions of the three-dimensional images that are not similar to the corresponding image values in the corresponding ASPECTS regions of the control; and
    determining whether the candidate ASPECTS regions cause the computed ASPECTS value to be reduced.

2. The system of claim 1, wherein the three-dimensional model accessed by the model providing unit comprises at least one of a skull, a left hemisphere, a right hemisphere, or ventricles.

3. The system of claim 2, wherein the left hemisphere and the right hemisphere of the three-dimensional model accessed by the model providing unit are symmetric to each other.

4. The system of claim 2, wherein the left hemisphere and the right hemisphere of the three-dimensional model accessed by the model providing unit are configured such that a same structure in the left hemisphere and the right hemisphere has a same topology, wherein the same topology comprises a same number of the triangular surface elements.

5. The system of claim 1, wherein the regions identifying unit is further configured to determine two-dimensional slices of the brain in the three-dimensional image based on the three-dimensional model applied to the three-dimensional image and to identify the ASPECTS regions in the determined two-dimensional slices.

6. The system of claim 5, wherein the regions identifying unit is configured to determine only two two-dimensional slices of the brain in the three-dimensional image based on the three-dimensional model applied to the three-dimensional image and to identify the ASPECTS regions in the determined two two-dimensional slices.

7. The system of claim 1, wherein the score determination unit is further configured to determine an ischemic change in the brain.

8. The system of claim 1, wherein the control corresponds to a healthy brain, wherein the score determination unit is further configured to:
    compare the image values of the ASPECTS region with the image values of the respective ASPECTS region of the control by applying the similarity measure to the image values;
    determine, among the candidate ASPECTS regions, candidate ASPECTS regions showing new ischemic stroke lesions;
    provide an initial score value; and
    determine the score by subtracting, for each candidate ASPECTS region, which has been determined as showing a new ischemic stroke lesion, a predefined value from the provided initial score.

9. The system of claim 1, wherein the three-dimensional model of the brain comprises 10 ASPECTS regions, and wherein the regions identifying unit is further configured to identify the 10 ASPECTS regions in the three-dimensional image by applying the three-dimensional model to the three-dimensional image.

10. The system of claim 1, wherein the image providing unit is configured to access a computed tomography (CT) image as the three-dimensional image.

11. A computer implemented method for identifying candidate Alberta Stroke Program Early Computer Tomography Score (ASPECTS) regions adversely affected by stroke in an image showing a brain, the method comprising:
- accessing a three-dimensional image of a brain;
- accessing a three-dimensional model of a head, wherein the three-dimensional model includes ASPECTS regions of a brain and defines axial slices, the three-dimensional model comprising a surface mesh composed of triangular surface elements, the axial slices consisting of two-dimensional axial slices;
- identifying ASPECTS regions in the three-dimensional image by applying the three-dimensional model to the three-dimensional image and delineating the ASPECTS regions onto the axial slices of the three-dimensional image; and
- automatically computing an ASPECTS value by comparing image values in the delineated ASPECTS regions of the three-dimensional image with corresponding image values of corresponding ASPECTS regions of a control according to a similarity measure by:
  - determining candidate ASPECTS regions, the candidate ASPECTS regions comprising image values in the delineated ASPECTS regions of the three-dimensional images that are not similar to the corresponding image values in the corresponding ASPECTS regions of the control; and
  - determining whether the candidate ASPECTS regions cause the computed ASPECTS value to be reduced.

12. A non-transitory computer readable medium storing instructions that, when executed by one or more processors, cause the one or more processors to:
- access a three-dimensional image of a brain;
- access a three-dimensional model of a head, wherein the three-dimensional model includes Alberta Stroke Program Early CT Score (ASPECTS) regions of a brain and defines axial slices, the three-dimensional model comprising a surface mesh composed of triangular surface elements, the axial slices consisting of two-dimensional axial slices;
- identify ASPECTS regions in the three-dimensional image by applying the three-dimensional model to the three-dimensional image and delineating the ASPECTS regions onto the axial slices of the three-dimensional image; and
- automatically computing an ASPECTS value by comparing image values in the delineated ASPECTS regions of the three-dimensional image with corresponding image values of corresponding ASPECTS regions of a control according to a similarity measure by:
  - determining candidate ASPECTS regions, the candidate ASPECTS regions comprising image values in the delineated ASPECTS regions of the three-dimensional images that are not similar to the corresponding image values in the corresponding ASPECTS regions of the control; and
  - determining whether the candidate ASPECTS regions cause the computed ASPECTS value to be reduced.

13. The non-transitory computer readable medium of claim 12, storing further instructions to:
- determine an ischemic change in the brain, based on image values within the ASPECTS regions.

14. The non-transitory computer readable medium of claim 13, wherein the control corresponds to a healthy brain, and storing further instructions to:
- compare the image values of the ASPECTS region with the image values of the respective ASPECTS region of the control by applying the similarity measure to the image values;
- determine, among the candidate ASPECTS regions, candidate ASPECTS regions showing new ischemic stroke lesions;
- provide an initial score value; and
- determine the score by subtracting, for each candidate ASPECTS region, which has been determined as showing a new ischemic stroke lesion, a predefined value from the provided initial score.

15. The non-transitory computer readable medium of claim 12, wherein the three-dimensional model defines slices of the brain, and storing further instructions to:
- determine two-dimensional slices of the brain in the three-dimensional image based on the three-dimensional model applied to the three-dimensional image; and
- identify the ASPECTS regions in the determined two-dimensional slices.

16. The non-transitory computer readable medium of claim 12, comprising further instructions to:
- determine a score, which is indicative of ischemic changes in the brain, based on image values within the ASPECTS regions.

17. The non-transitory computer readable medium of claim 12, wherein the three-dimensional model of the brain comprises 10 ASPECTS regions, wherein the 10 ASPECTS regions are identified in the three-dimensional image by applying the three-dimensional model to the three-dimensional image.

18. The non-transitory computer readable medium of claim 12, wherein the three-dimensional image is a computed tomography (CT) image.

* * * * *